United States Patent
Schade

(10) Patent No.: US 7,441,708 B2
(45) Date of Patent: Oct. 28, 2008

(54) MEMORY CARD SOCKET USING A DUAL-PORTED USB INTERFACE

(76) Inventor: Peter Arthur Schade, 744 S. Hillview Dr., Milpitas, CA (US) 95035

( * ) Notice: Subject to any disclaimer, the term of this patent is extended or adjusted under 35 U.S.C. 154(b) by 67 days.

(21) Appl. No.: 10/811,455

(22) Filed: Mar. 25, 2004

(65) Prior Publication Data

US 2004/0260855 A1    Dec. 23, 2004

Related U.S. Application Data

(60) Provisional application No. 60/458,662, filed on Mar. 28, 2003, provisional application No. 60/458,759, filed on Jun. 16, 2003.

(51) Int. Cl.
*G06K 7/00*    (2006.01)
(52) U.S. Cl. .................. 235/486; 710/300; 710/313
(58) Field of Classification Search .......... 235/486, 235/492; 710/300–304, 313
See application file for complete search history.

(56) References Cited

U.S. PATENT DOCUMENTS

| | | | |
|---|---|---|---|
| 5,772,453 A * | 6/1998 | Tan et al. ............... | 439/79 |
| 5,954,523 A * | 9/1999 | Babcock ............... | 439/79 |
| 6,776,658 B2 * | 8/2004 | Tang ................... | 439/607 |
| 7,003,613 B1 * | 2/2006 | Wang et al. ............ | 710/305 |
| 2004/0033727 A1 * | 2/2004 | Kao ..................... | 439/660 |
| 2004/0059846 A1 * | 3/2004 | Liu et al. ............... | 710/62 |

* cited by examiner

*Primary Examiner*—Thien M. Le
*Assistant Examiner*—Edwyn Labaze
(74) *Attorney, Agent, or Firm*—Sawyer Law Group LLP

(57) ABSTRACT

In order to greatly simplify the electronics of devices utilizing memory cards, a new type of interface specification is presented which is called DPXD for a "Dual Ported extended Digital" memory card. The DPXD interface specification comprises an electrical signal set definition based upon a new dual USB concept call Dual Ported USB or DPUSB, a mechanical and electrical definition for a memory card socket, an associated memory card signal and mechanical specification for a memory card, and a mechanical definition for cables compatible with the DPXD socket.

5 Claims, 4 Drawing Sheets

Interface Ports of a Typical Portable Digital Device (PDD)

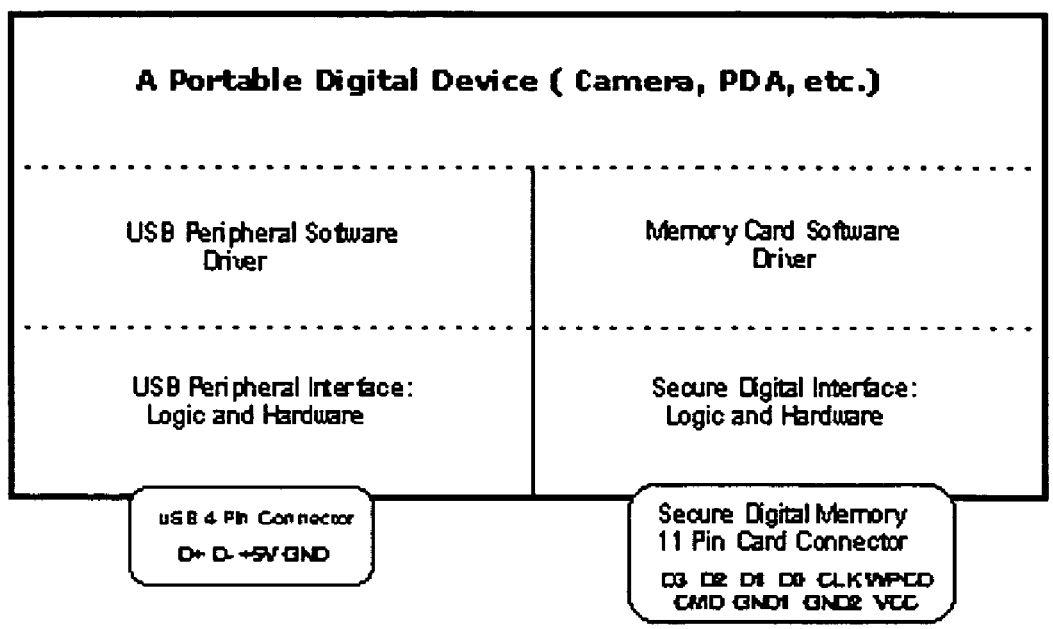
Figure 1: Interface Ports of a Typical Portable Digital Device (PDD)

| Pin # | SD | DPXD |
|---|---|---|
| 1 | D3 | DP- |
| 2 | D2 | DP+ |
| 3 | D1 | DH- |
| 4 | D0 | DH+ |
| 5 | CMD | RESERVED |
| 6 | CLK | VCCH |
| 7 | VCC | VCCP |
| 8 | GND | GNDH |
| 9 | GND | GNDP |
| 10 | WP | WP |
| 11 | CD | CD |

Note: SD connectors have an additional two special pins:
A Card Detect pin and a Write Detect pin Figure 2: DPXD Pin Assignments Mapped to Secure Digital Pins Using DPUSB Signals

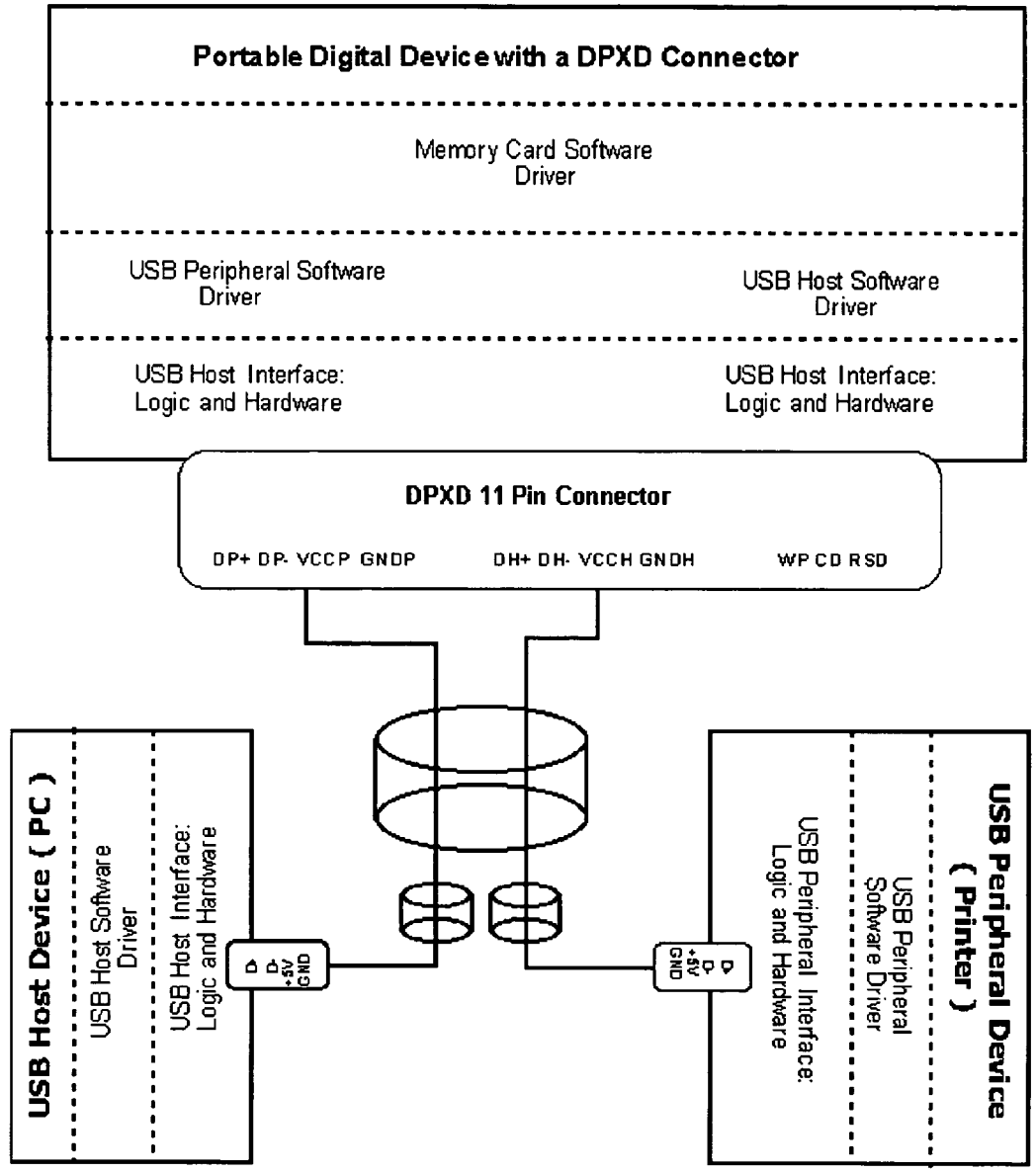
Figure 3: A Portable Digital Device with a DPXD Connector
Interfaced to a USB Host Device and a USB Peripheral Device

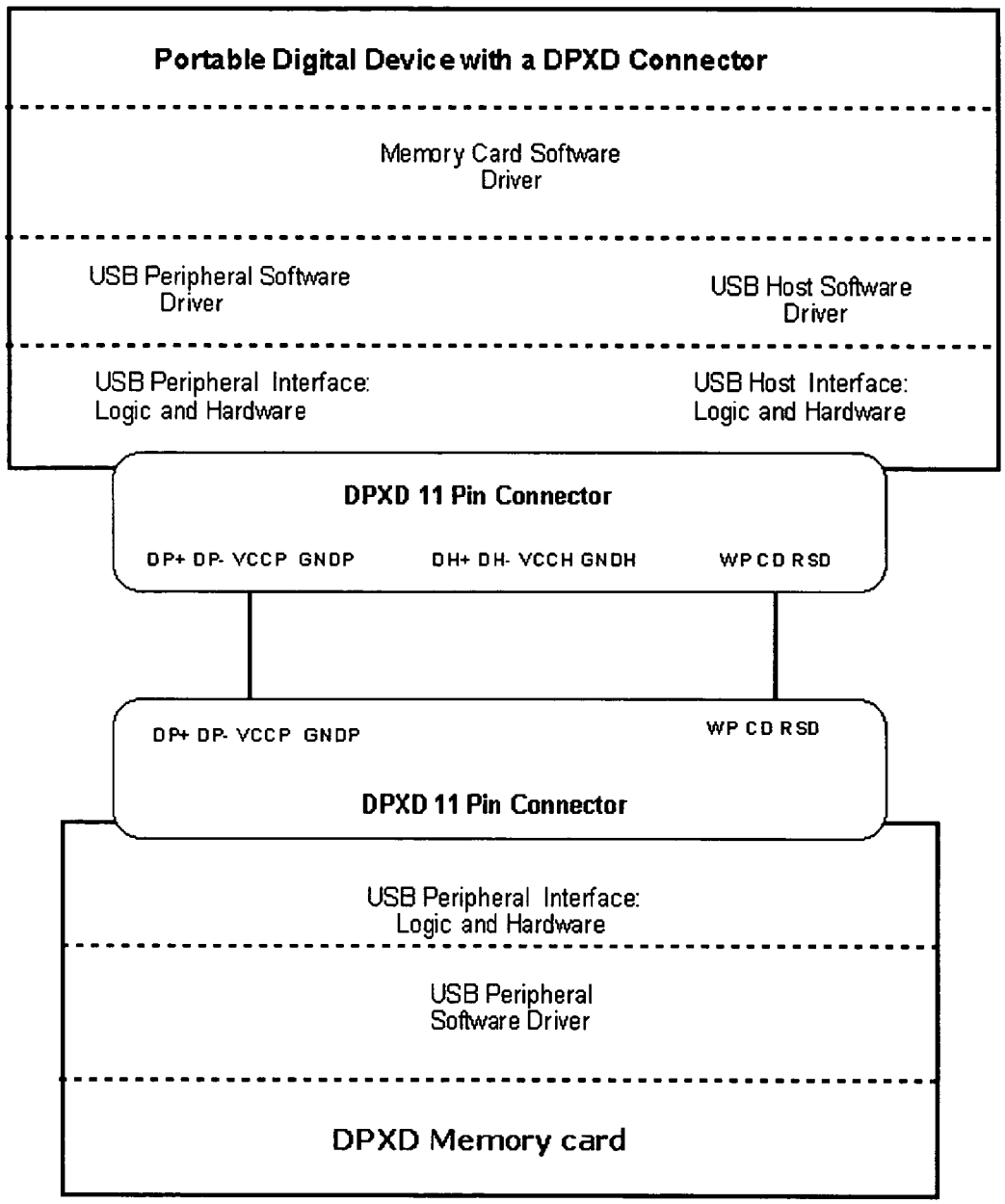
Figure 4: A Portable Digital Device with a DPXD Connector Interfaced to a DPXD Memory Card

MEMORY CARD SOCKET USING A DUAL-PORTED USB INTERFACE

This application claims the benefits of 60/458,662 filed on Mar. 28, 2003 and claims benefits of 60/458,759 filed on Jun. 16, 2003.

RELATED APPLICATIONS

The present invention is related to co-pending U.S. patent application, entitled DUAL PORT USB INTERFACE, Ser. No. 10/810,113 (2797P), filed on even date herewith, and assigned to the assignee of the present invention.

FIELD OF THE INVENTION

The present invention relates generally to processing systems and more particularly to memory card sockets for use with such processing systems.

BACKGROUND OF THE INVENTION

There are many types of memory card interfaces available today. Although no one memory form factor is presently dominant, the postage size Secure Digital Card (SD) or similar 9 pin signal memory card has captured a significant portion of the new memory sockets on portable digital devices such as digital camera's and Personal Data Assistants (PDAs).

Many of these portable devices also include a USB peripheral port to interface to standard Personal Computers (PCs). FIG. 1 shows interface ports of a typical portable digital device (PDD). As can be seen in FIG. 1, devices using SD memory cards typically include interface hardware, software and mechanical connectors for both an SD card and a USB peripheral port. In addition, these devices may also require additional software, hardware and a mechanical connector to interface to other peripherals such as printers.

Accordingly, what is needed is a system and method for allowing for interfaces to be utilized in a variety of environments. The present invention addresses such a need.

SUMMARY OF THE INVENTION

In order to greatly simplify the electronics of devices utilizing memory cards, a new type of memory card interface specification is described for a "Dual Ported extended Digital" (DPXD) memory card. The DPXD interface specification comprises an electrical signal set definition, a mechanical and electrical definition for a memory card socket, an associated memory card signal and mechanical specification for a memory card, and a mechanical definition for cables compatible with the DPXD socket.

BRIEF DESCRIPTION OF THE DRAWINGS

FIG. 1 shows interface ports of a typical portable digital device (PDD).

FIG. 2 shows DPXD pin assignments mapped to secure digital pins using DPUSB signals.

FIG. 3 shows a portable digital device with a DPXD converter interface to a USB host device and a USB peripheral device.

FIG. 4 shows a portable digital device with a DPXD connector interfaced to a DPXD memory card.

DETAILED DESCRIPTION

The present invention relates generally to processing systems and more particularly to memory card sockets for use with such processing systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

DPXD Signal Definitions

The Dual Patent eXtended Digital (DPXD) electrical signals are a superset of the signals that constitute a DPUSB signal set. U.S. patent application Ser. No. 10/810,113 (2979P) entitled DUAL PORT USB INTERFACE, describes a dual ported USB interface with both USB Host and Peripheral signal sets. The eight default signals defined for a DPUSB connector are D+H, D−H, D+P, D−P, GNDH, GNDP, +5VH, and +5VP. The D+H and D−H are the Host differential data lines. The D+P and D−P are the Peripheral differential data lines. The GNDH and +5VH are the Host power lines. And the GNDP and +5VP are the Peripheral power lines.

The 11 signals making up the DPXD signal set includes the eight DPUSB signals, plus one Reserved Signal, a Write Protect Signal, and a Card Detect Signal.

Components with DPXD Plugs

FIG. 2 shows DPXD pin assignments mapped to secure digital pins using DPUSB signals. The DPXD socket has the same mechanical form factor as a SD card and the same number of electrical connections as an SD card. The devices targeted for plugging into a DPXD socket are memory cards, wireless cards, and other compatible form factor components that will give the device which includes the DPXD socket added functionality. In addition, various types of cables with DPXD plugs are possible that will allow various types of connections to other digital devices which utilize either standard USB ports or include their own DPUSB connectors.

Connection of a PDD to Two Other USB Devices

Since the DPXD socket supports a full DPUSD interface, a device with a DPXD socket can be easily connected to many types of devices. FIG. 3 shows a portable digital device with a DPXD socket interfaced to both a USB host device such as a PC and a USB peripheral device such as a printer.

A DPXD Memory Card

A DPXD compatible memory card utilizes a DPUSB signal set in a DPXD mechanical form factor. FIG. 4 shows a portable digital device 100 using a DPXD socket in which a DPXD memory card is easily interfaced with a DPXD socket. Note that in this implementation, the DPXD memory card does not utilize the USB Host signals available on the DPXD socket. Instead the memory card acts as a pure USB Peripheral Memory device only with the addition of a write protect pin and a card detect pin.

Legacy Connection to Standard SD Cards

It is also possible to design the electronics of a device with a DPXD socket such that it can support both a DPXD memory card as shown in FIG. 4 and a standard SD memory card. In this case, when the software of a device with a DPXD socket recognizes using the card detect pin that a memory card has been inserted, the DPXD socket device would begin an arbitration process to determine whether the inserted card is an SD card or a DPXD memory card.

CONCLUSION

Electronic devices such as PDA's and digital cameras which are designed with a DPXD socket and supporting electronic software and hardware can successfully interface to both SD and DPXD memory cards. Thus inclusion of a DPXD socket provides a device with the possibility of compatibility to both an existing SD memory cards as well as the described DPXD memory cards. In addition, with suitable cables that can plug into a DPXD socket, devices with DPXD sockets can easily interface to standard USB Hosts such as PC's and USB peripherals such as printers as well as devices with their own DPXD sockets or other DPUSB form factor sockets.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An interface definition comprising:
   an electrical signal set definition, wherein the eletrical signal set defintion comprises eight (DPUSB) signals, one reserved signal, a write protect signal and a card detect signal and wherein the eight DPSUB signals comprises peripheral differential data lines and host differential data lines;
   a mechanical and electrical definition for a memory card;
   an associated memory card signal and mechanical specification for a memory card; and
   a mechanical definition for cables compatible with an interface socket.

2. The interface definition of claim 1 wherein pin assignments are mapped digital pins using DPUSB signals.

3. An interface socket comprising:
   a signal set that defines a peripheral port, a host port, a write-protect signal, wherein the eletrical signal set definition comprises eight (DPUSB) signals, one reserved signal, a write protect signal and a card detect signal and wherein the eight DPSUB signals comprises peripheral differential data lines and host differential data lines; and
   a form factor that is equivalent to a secure digital card.

4. The interface socket of claim 3 wherein pin assignments are mapped to digital pins using DPUSB signals.

5. The interface socket of claim 3 wherein the socket can be interfaced to both a USB host device and a USB peripheral device.

\* \* \* \* \*